US009452659B2

(12) United States Patent
Styles et al.

(10) Patent No.: US 9,452,659 B2
(45) Date of Patent: Sep. 27, 2016

(54) METHOD AND APPARATUS FOR CONTROLLING A COMBINED HEATING AND COOLING VAPOR COMPRESSION SYSTEM

(71) Applicant: GM GLOBAL TECHNOLOGY OPERATIONS LLC, Detroit, MI (US)

(72) Inventors: Bryan M. Styles, South Lyon, MI (US); Mark D. Nemesh, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 763 days.

(21) Appl. No.: 13/731,247

(22) Filed: Dec. 31, 2012

(65) Prior Publication Data

US 2014/0182832 A1    Jul. 3, 2014

(51) Int. Cl.
*B60H 1/00* (2006.01)
*F24F 3/14* (2006.01)

(52) U.S. Cl.
CPC ....... B60H 1/00278 (2013.01); B60H 1/00807 (2013.01); B60H 1/00899 (2013.01); B60H 2001/00949 (2013.01)

(58) Field of Classification Search
CPC ............... B60H 1/00278; B60H 2001/00949; B60H 1/00899; B60H 1/00807; B60H 1/00271; B60H 1/00878
USPC .................. 165/202, 222; 62/117, 239, 324.1
See application file for complete search history.

(56) References Cited

U.S. PATENT DOCUMENTS

| 8,393,551 | B2* | 3/2013 | Nemesh | B60H 1/00392 237/12.3 B |
|---|---|---|---|---|
| 8,805,602 | B2* | 8/2014 | Yun | H05K 7/20927 180/65.31 |
| 8,973,387 | B2* | 3/2015 | Osaka | B60H 1/00021 62/160 |
| 9,136,549 | B2* | 9/2015 | Vollmer | H01M 8/04007 |
| 2005/0178523 | A1* | 8/2005 | Itoh | B60H 1/00385 165/42 |
| 2007/0245737 | A1* | 10/2007 | Inaba | B60H 1/00885 60/670 |

(Continued)

FOREIGN PATENT DOCUMENTS

CN        1606512 A        4/2005
CN     201935477 U        8/2011

(Continued)

*Primary Examiner* — Frantz Jules
*Assistant Examiner* — Claire Rojohn, III
(74) *Attorney, Agent, or Firm* — Quinn Law Group, PLLC

(57) ABSTRACT

A system and method for controlling a combined heating and cooling vapor compression system are provided. The apparatus may be a vehicle and may include a cabin, a vehicle battery, a Rechargeable Energy Storage System (RESS), and a vapor-compression system, having at least one controller, operable in a variety of modes selectable to facilitate cooling, heating, and dehumidification of the vehicle cabin. The method may include steps to adjust evaporator air temperature to control comfort, fogging and smell in the cabin by adjusting the compressor speed; regulate heat pump performance by adjusting the output of an electric heater and adjusting the flow of coolant through the RESS chiller; and evaluating and optimizing the discharge pressure and suction pressure of the compressor by adjusting the compressor speed and adjusting the coolant flow through the RESS chiller.

12 Claims, 11 Drawing Sheets

(56) References Cited

U.S. PATENT DOCUMENTS

| | | | |
|---|---|---|---|
| 2008/0251235 A1* | 10/2008 | Zhou | B60H 1/00278 165/41 |
| 2009/0243538 A1* | 10/2009 | Kelty | B60L 11/1851 320/104 |
| 2009/0246606 A1* | 10/2009 | Shimizu | H01M 10/625 429/62 |
| 2009/0248204 A1* | 10/2009 | Kikuchi | B60H 1/00278 700/275 |
| 2009/0249802 A1* | 10/2009 | Nemesh | B60H 1/00278 62/56 |
| 2009/0249807 A1* | 10/2009 | Nemesh | B60H 1/00278 62/117 |
| 2009/0280395 A1* | 11/2009 | Nemesh | B60H 1/00278 429/62 |
| 2009/0317697 A1* | 12/2009 | Dogariu | B60H 1/00278 429/62 |
| 2010/0009246 A1* | 1/2010 | Maitre | H01M 10/625 429/62 |
| 2010/0012295 A1* | 1/2010 | Nemesh | B60H 1/00278 165/104.19 |
| 2010/0089547 A1* | 4/2010 | King | B60L 3/0046 165/42 |
| 2010/0175406 A1* | 7/2010 | Wankhede | B60H 1/00278 62/285 |
| 2010/0180610 A1 | 7/2010 | Wankhede et al. | |
| 2010/0186440 A1* | 7/2010 | Hong | B60H 1/005 62/434 |
| 2010/0229577 A1* | 9/2010 | Hong | B60H 1/00885 62/190 |
| 2010/0258063 A1* | 10/2010 | Thompson | H01M 8/04029 123/41.19 |
| 2011/0139397 A1* | 6/2011 | Haussmann | B60H 1/00278 165/43 |
| 2011/0174000 A1* | 7/2011 | Richter | B60H 1/00064 62/93 |
| 2011/0219797 A1* | 9/2011 | Taguchi | B60H 1/3208 62/129 |
| 2011/0239697 A1* | 10/2011 | Styles | F25B 39/022 62/524 |

FOREIGN PATENT DOCUMENTS

| | | |
|---|---|---|
| CN | 102723450 A | 10/2012 |
| WO | 2012114767 A1 | 8/2012 |

\* cited by examiner

FIG. 9
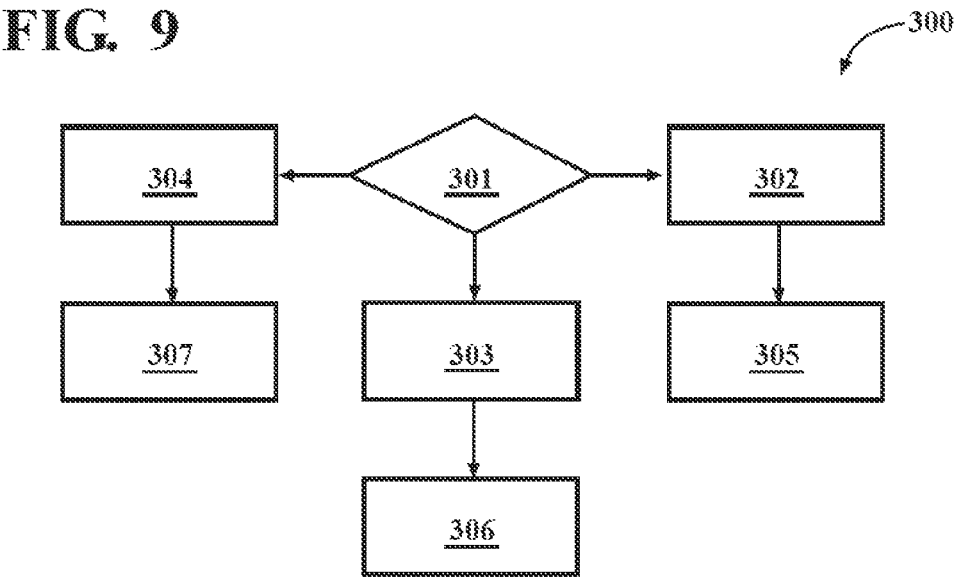
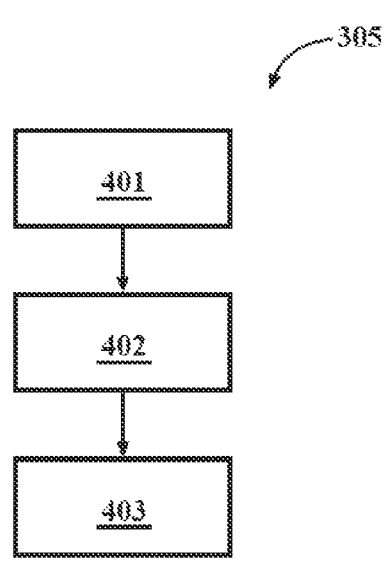
FIG. 10
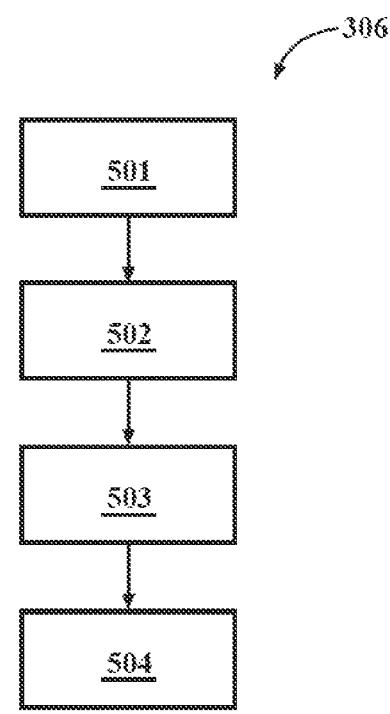
FIG. 11

METHOD AND APPARATUS FOR CONTROLLING A COMBINED HEATING AND COOLING VAPOR COMPRESSION SYSTEM

TECHNICAL FIELD

The disclosure relates to a method for controlling a combined heating and cooling vapor compression system for use in a vehicle.

BACKGROUND

Hybrid electric vehicles selectively use an internal combustion engine as a source of input torque to a transmission, alone or in conjunction with the traction motor(s), while extended-range electric vehicles use a smaller engine only when needed, and solely to power an electric generator. Battery electric vehicles forego use of the small gas engine, and instead operate using stored electrical energy or regenerative braking energy. All three vehicle configurations can operate solely on electricity in what is referred to as an electric vehicle (EV) mode.

In some of the above vehicle embodiments, a Rechargeable Energy Storage System (RESS) is used to alternatively store and deliver the substantial amounts of electrical energy needed for driving the traction motor(s). The RESS may consist of a battery pack having multiple battery modules each containing multiple cylindrical or flat/tabular battery cells.

It is desired to employ vapor compression systems within the above vehicle embodiments that may operate efficiently, while allowing for extended electric range operation at a variety of ambient temperatures.

SUMMARY

A method and apparatus for controlling a combined heating and cooling vapor compression system are provided. The apparatus may be a vehicle and may include a cabin, a Rechargeable Energy Storage System (RESS), a RESS chiller, and a vapor-compression system. The vapor compression system may include at least one controller, a compressor, a cabin evaporator, at least two heat exchangers, and an electric heater. The vapor compression system may be operable in a variety of modes, including at least a first mode, second mode, third mode, and fourth mode. Each of the respective modes being selectable to facilitate cooling, heating, and dehumidification of the vehicle cabin. The at least one controller is configured to, via the present method, control and optimize the heating and cooling capabilities of the vapor compression system.

The method for controlling a combined heating and cooling vapor compression system may include several steps. The method may include: detecting one of a first precondition, a second precondition, and a third precondition, with at least one controller. The first precondition is a demand for cooling in a vehicle cabin. The second precondition is a demand for heating and dehumidification in the vehicle cabin. The third precondition is a demand for heating only in the vehicle cabin. The method may additionally include: executing a first control action, with the at least one controller, when the first precondition is detected. Executing a first control action allows the vapor compression system to operate in a first mode, wherein cooling of the cabin is demanded. The method may additionally include: executing a second control action, with the at least one controller, when the second precondition is detected. Executing a second control action allows the vapor compression system to operate in a second mode, wherein each of heating of the cabin and dehumidification of the cabin are demanded. Finally, the method may include: executing a third control action, with the at least one controller, when the third precondition is detected. Executing a third control action allows the vapor compression system to operate in a third mode, wherein only heating of the cabin is demanded.

The first control action may further include steps necessary to facilitate cooling of the vehicle cabin.

The second control action may further include steps to facilitate the optimization of the evaporator air temperature of a cabin evaporator and steps to regulate heat pump performance. Evaporator air temperature may be determined in order to control cabin comfort, cabin fogging, and cabin smell by adjusting the speed of a compressor. Heat pump performance may be regulated by adjusting the output of the heater and adjusting the flow of refrigerant through the RESS or RESS chiller.

The third control action may further include steps to maximize the efficiency of the vapor compression system and the heat pump performance thereof. The efficiency and heat pump performance of the vapor compression system may be maximized by evaluating and optimizing the discharge pressure and suction pressure of the compressor by adjusting the compressor speed and adjusting the refrigerant flow through the second heat exchanger.

The above features and advantages, and other features and advantages, of the present invention are readily apparent from the following detailed description of some of the best modes and other embodiments for carrying out the invention, as defined in the appended claims, when taken in connection with the accompanying drawings.

BRIEF DESCRIPTION OF THE DRAWINGS

FIG. 9 is a flow diagram detailing a method of detecting a need for one of cabin cooling, cabin heating and dehumidification, and cabin heating only in a vehicle cabin and executing one of a first control action, a second control action, and a third control action.

FIG. 10 is a flow diagram detailing the steps necessary to carry out the first control action;

FIG. 11 is a flow diagram detailing the steps necessary to carry out the second control action;

DETAILED DESCRIPTION

The following description and figures refer to example embodiments and are merely illustrative in nature and not intended to limit the invention, its application, or uses. Throughout the figures, some components are illustrated with standardized or basic symbols. These symbols are representative and illustrative only, and are in no way limiting to any specific configuration shown, to combinations between the different configurations shown, or to the claims. All descriptions of componentry are open-ended and any examples of components are non-exhaustive.

Referring to the figures, wherein like reference numbers correspond to like or similar components throughout the several views, a control strategy 300 for controlling a vapor compression system 100, 200 for use in a vehicle having a cabin 122 and an RESS chiller 115 housed either within or external to a Rechargeable Energy Storage System (RESS) 110 is provided.

Figure 12:
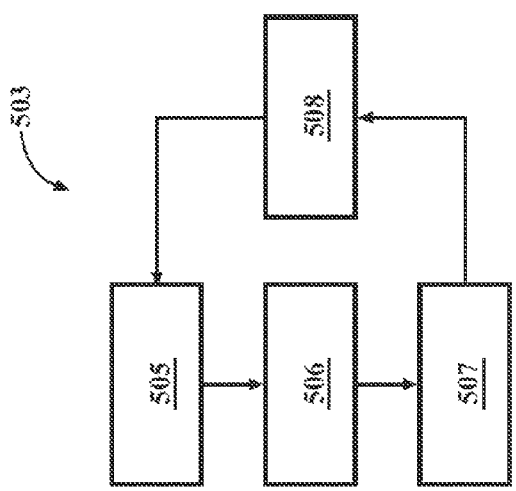
FIG. 12 is a flow diagram detailing the third step of the second control action, namely, operating a compressor to circulate the refrigerant through the vapor compression system.

The vapor compression system 100, 200 may be configured to control the temperature of the cabin 122 and the RESS 110. The vapor compression system 100 and the control strategy 300 therefor are described herein and shown in FIGS. 1-12. The vapor compression system 100, 200 is described with respect to a first operating mode, shown in FIGS. 1 and 2, a second operating mode, shown in FIGS. 3 and 4, a third operating mode, shown in FIGS. 5 and 6, and a fourth operating mode, shown in FIGS. 7 and 8. The control strategy and method 300 are shown generally in the flow diagram of FIG. 9 and with respect to a first control action 305 detailed in FIG. 10, a second control action 306 detailed in FIGS. 11-13 and a third control action 307 detailed in FIG. 14.

Referring generally to FIGS. 1-8, the vapor compression system 100, 200 may be utilized within a vehicle having a cabin 122, an RESS chiller 115, and an RESS 110. The vapor compression system 100, 200 may include at least one controller 123, a compressor 102, a cabin evaporator 113, a first heat exchanger 103, a second heat exchanger 111a, 111c, a first flow control valve 120, a second flow control valve 106, and an electric air heater 112.

The compressor 102 may be driven by an electric motor (not shown), which may be of the single or variable speed variety. The compressor 102 may also be a pump driven by a belt connected to the propulsion system (not shown). The compressor 102 may have an inlet 126 and an outlet 127 and may be configured to receive refrigerant gas at the inlet 126. At least one low-side refrigerant pressure sensor 116 may be positioned on the low-pressure side of the compressor 102 proximate the compressor inlet 126, to evaluate the compressor inlet 126 suction pressure. The compressor 102 pressurizes the refrigerant gas into a high-pressure state. The compressor 102 is further configured to expel compressed refrigerant gas at the outlet 127, across at least one high-side refrigerant pressure sensor 117, positioned on the high-pressure side of the compressor 102 proximate the compressor outlet 127. The high-side pressure sensor 117 is configured to evaluate the compressor discharge pressure. The compressor 102 may expel refrigerant across the high-side pressure sensor 117 to one of the first heat exchanger 103 and the second heat exchanger 111a, 111c, depending upon the operational mode selected by the controller 123, as described herein below.

The first heat exchanger 103 may be configured to receive refrigerant from the compressor 102 and further configured to cool and condense pressurized refrigerant gas as it flows through the first heat exchanger 103, to the extent that the pressurized refrigerant gas is cooled and condensed to a point at which it is reclaimed into a liquid state. The first heat exchanger 103 may be a refrigerant-to-air heat exchanger and may be in heat exchange relation with the refrigerant flowing through the first heat exchanger 103 and the ambient air. The first heat exchanger 103 may be configured to expel cooled liquid refrigerant to a first flow control valve 120.

The second heat exchanger 111a, 111c may be configured to receive refrigerant from the compressor 102 and further configured to cool and condense the refrigerant. As shown in FIGS. 1, 3, 5, and 7 the second heat exchanger 111a may be a refrigerant-to-air heat pump condenser. The second heat exchanger 111a may be in heat exchange relation with the refrigerant flowing through the second heat exchanger 111a and air flowing across the second heat exchanger 111a. As shown in FIGS. 2, 4, 6, and 8, the second heat exchanger 111c may also be a refrigerant-to-coolant heat exchanger 111c located in the vehicle underhood 160. The second heat exchanger 111c may have a second refrigerant cavity 140 and a second coolant cavity 137. The second refrigerant cavity 140 and the refrigerant flowing therethrough may be in heat exchange relation with the second coolant cavity 137 and a coolant flowing therethrough. The second heat exchanger 111c may be configured to expel cooled liquid refrigerant to a first flow control valve 120.

The first flow control valve 120 may be a three-way two-position valve. The first flow control valve 120 may be configured to occupy one of a first position to facilitate cabin cooling (shown in FIGS. 1 and 2), a second position to facilitate cabin heating and dehumidification (shown in FIGS. 3 and 4) or cabin heating only (shown in FIGS. 5 and 6), and a third position to allowing cabin heat and cooling simultaneously (shown in FIGS. 7 and 8). The first flow control valve 120 may also be replaced by two independent flow control valves capable of metering flow through the first heat exchanger 103 and the second heat exchanger 111a, 111c.

The receiver dryer 105 may be configured to receive high-pressure liquid refrigerant from the first flow control valve 120. The receiver dryer 105 may include a plurality of desiccants (not shown) to attract and remove moisture from the refrigerant. The receiver dryer 105 may be further configured to expel the high pressure refrigerant liquid to one of a first expansion device 108 and a second expansion device 107, via a second flow control valve 106.

If dehumidification of the cabin 122 is not needed, all of the liquid refrigerant will be directed to the first expansion device 108, due to the second flow control valve 106 being in the closed position.

The first expansion device 108 may allow the high pressure liquid refrigerant to expand, reducing the pressure in the system 100, 200. The first expansion device 108 may direct and selectively distribute refrigerant to the RESS chiller 115, at a significantly reduced pressure. The second expansion device 108 may be a thermostatic or thermal expansion valve, and may be configured to hold a constant evaporator superheat state as the refrigerant enters the RESS chiller 115, which acts as an evaporator. The second expansion device 108 may monitor, such as with a sensor or a bulb, the temperature of the refrigerant leaving the RESS chiller 115, and may improve the performance of the heat exchange by letting additional or less refrigerant into the RESS chiller 115.

The RESS may house the vehicle battery 101, a battery heater 109, and the RESS chiller 115. The RESS chiller 115 may be located within or exterior to the RESS 110. The RESS chiller 115 may be a refrigerant-to-coolant heat exchanger and may include a first coolant cavity 131 and a first refrigerant cavity 132. The RESS chiller 115 may be configured to exchange heat between the first coolant flowing through the first coolant cavity 131 and the refrigerant flowing through the first refrigerant cavity 132. The first coolant may be circulated along a first coolant loop 124, via a first coolant pump 128 and the refrigerant circulated by the compressor 102. The first coolant pump 128 may be driven at various speeds, in order to change the coolant flow rate through the RESS chiller 115 and the RESS 110. The RESS chiller 115 may function as an evaporator to dissipate heat from the RESS 110 via the first coolant to the refrigerant. The RESS 110 may direct refrigerant back to the compressor 102.

If dehumidification of the cabin 122 is needed, the second flow control valve 106 may be partially or fully open allowing some or all of the refrigerant expelled from receiver dryer 105 to be distributed to a second expansion device 107. The second expansion device 107 may direct and selectively distribute refrigerant to the cabin evaporator 113, at a significantly reduced pressure. The second expansion device 107 may be a thermostatic or thermal expansion valve, and may be configured to hold a constant evaporator superheat state as the refrigerant enters the cabin evaporator 113. The second expansion device 107 may monitor, such as with a sensor or a bulb, the temperature of the refrigerant leaving the cabin evaporator 113, and may improve the performance of the heat exchange by letting additional or less refrigerant into the cabin evaporator 113.

The cabin evaporator 113 may be located within the HVAC module (not shown). The cabin evaporator 113 may include coils (not shown). The cabin evaporator 113 may be configured to cool and dehumidify the air flowing across the coils (not shown) and into the cabin 122. The cabin evaporator 113 may further include a fan (not shown) to direct air over the coils impregnated with refrigerant, and facilitate the direction of the air into the cabin 122. The cabin evaporator 113 may be further configured to direct refrigerant back to the compressor 102.

The vapor compression system 100, 200 may also include an electric heater 112. The heater may be housed in the HVAC module. The heater 112 may condition and warm the air to be received by the cabin 122.

As shown in FIGS. 2, 4, 6, and 8, a third heat exchanger 118 may be a coolant-to-air heat exchanger such as a conventional coolant heater core. The third heat exchanger 118 may be placed within a second coolant loop 169 along with the second heat exchanger 111c, which is a refrigerant-to-coolant heat exchanger. Coolant circulated along the second coolant loop 169 may be circulated via a second coolant pump 129. The warmed coolant flowing through the second coolant cavity 137 of the second heat exchanger 111c may be expelled from the second coolant cavity 137 and directed through the third heat exchanger 118. The third heat exchanger 118 may expel coolant back to the second coolant cavity 137 of the second heat exchanger 111c.

As shown in FIGS. 1-8, each of the vapor compression system 100, 200 includes at least one controller 123 that is electrically connected with at least one electrical connection 136. The at least one controller 123 is configured to monitor and control the vapor compression system 100, 200 in a variety of operating modes and execute process instructions embodying a method having a first control action 302, a second control action 303, and a third control action 304, shown in FIG. 9.

The at least one controller 123 may be configured to communicate with the motor (not shown) which may drive the compressor 102. The at least one control module 123 may further be configured to communicate with the compressor 102; the first and second expansion devices 108, 107; the first and second flow control valves 120, 106; the first and the second coolant pumps 128, 129; and other subsystems through the at least one electrical connection 136.

The controller 123 may be embodied as a host machine or distributed system, e.g., a digital computer or microcomputer, acting as a vehicle control module, and/or as a proportional-integral-derivative (PID) controller device having a processor, and tangible, non-transitory memory such as read-only memory (ROM) or flash memory. The controller 123 may also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry.

Referring to FIGS. 9-14, in conjunction with the structure of the example systems 100, 200 shown in FIGS. 1-8, the present method (shown in flow chart form in FIG. 9 at 300) may be beneficially used to effectuate a control strategy for a vapor compression system 100, 200.

Referring to FIG. 9, at step 301, the controller 123 detects one of a first precondition 302, a second precondition 303, and a third precondition 304. The first precondition 302 is an indication of a need for cooling in a vehicle cabin 122. The second precondition 303 is an indication of a need for heating and dehumidification in the vehicle cabin 122. The third precondition 304 is an indication of a need for heating only in the vehicle cabin 122.

Figure 1:
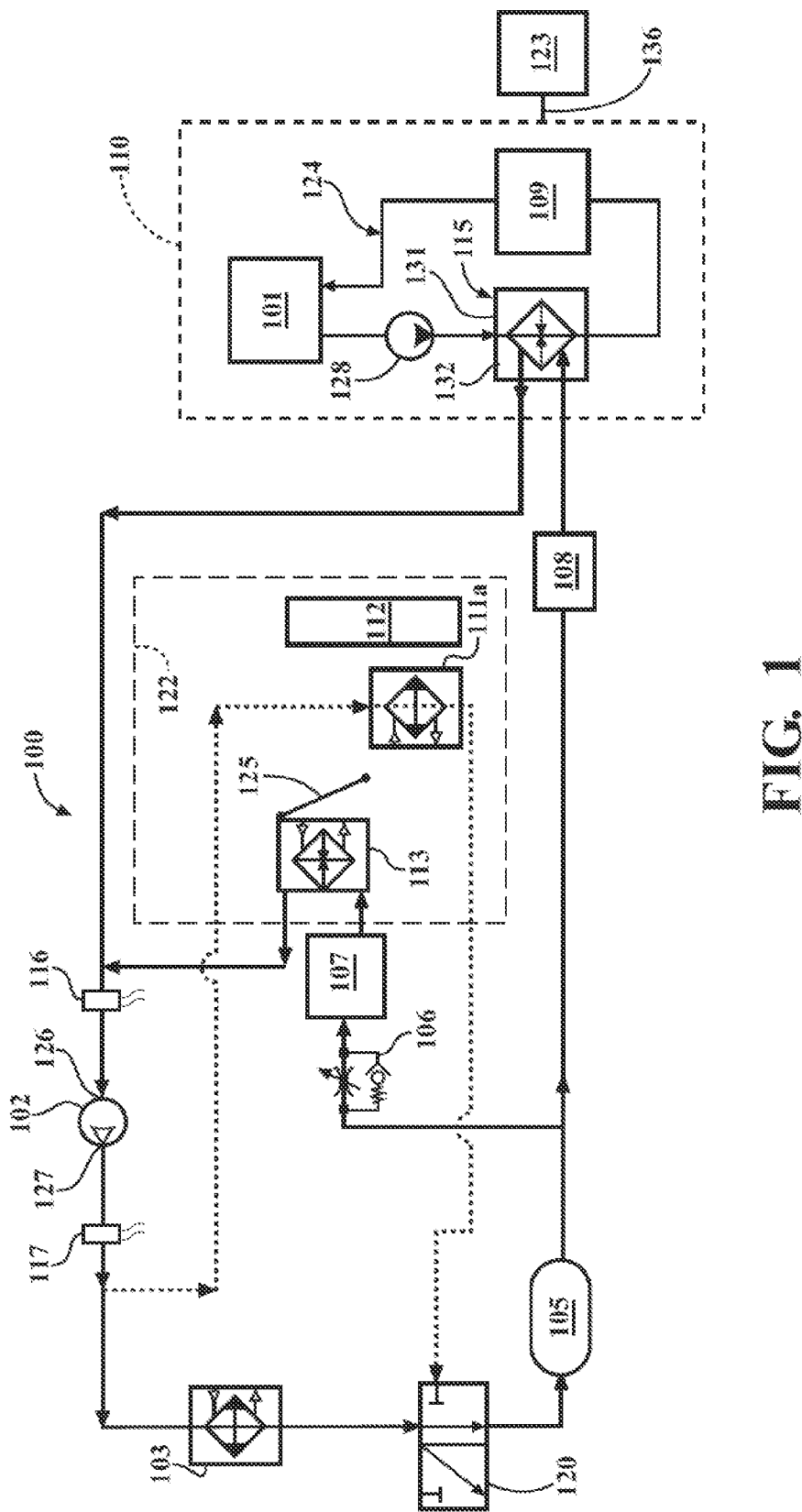
FIG. 1 is a schematic diagram of a first embodiment of the vapor compression system operating in a first mode.
Figure 2:
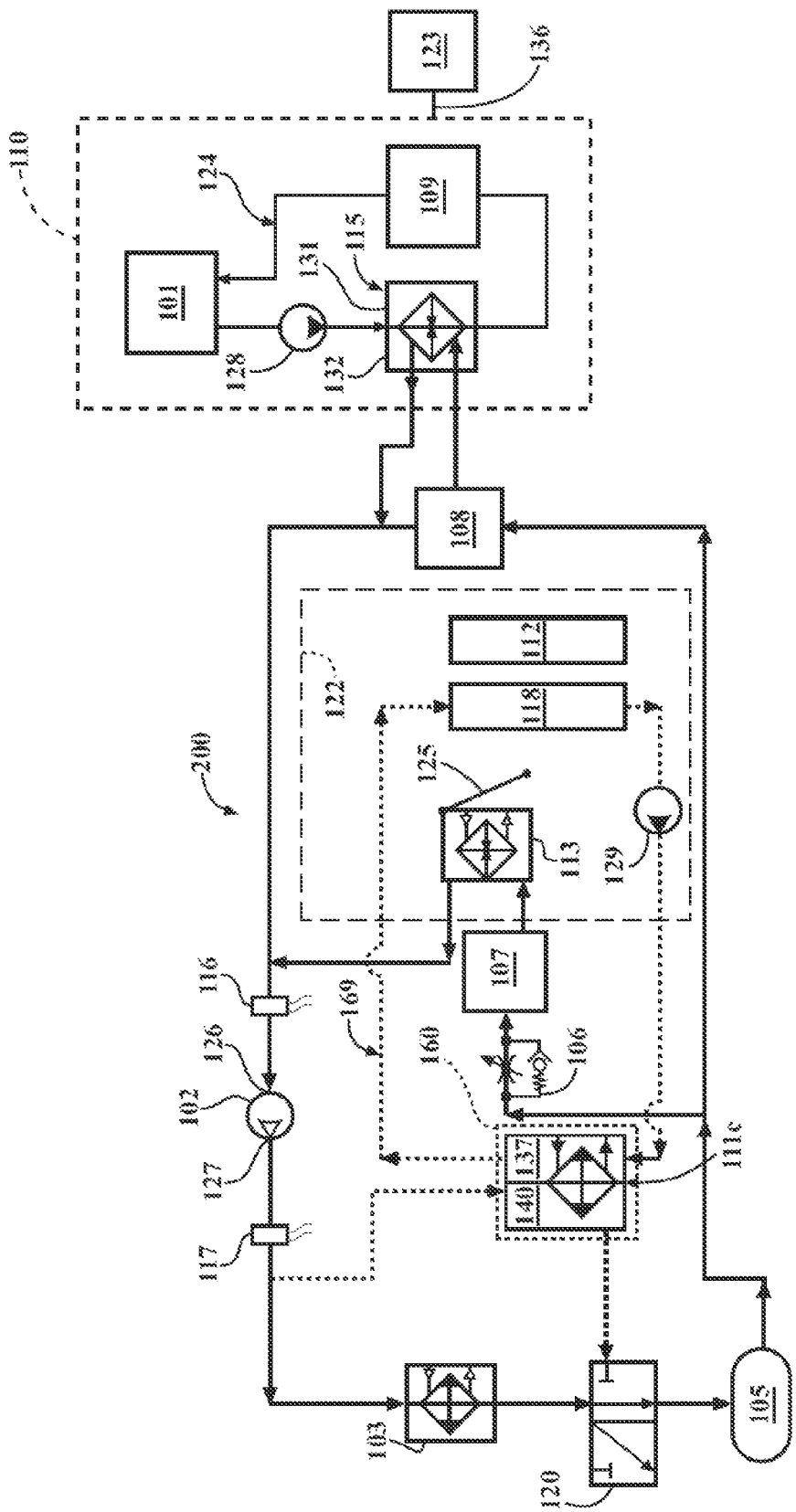
FIG. 2 is a schematic diagram of a second embodiment of the vapor compression system operating in the first mode.

If the controller 123 detects the first precondition 302 indicating that cabin cooling is required, the controller 123 will execute the first control action, shown at step 305, to allow the vapor compression system to operate in a first mode (shown in FIGS. 1 and 2).

Figure 3:
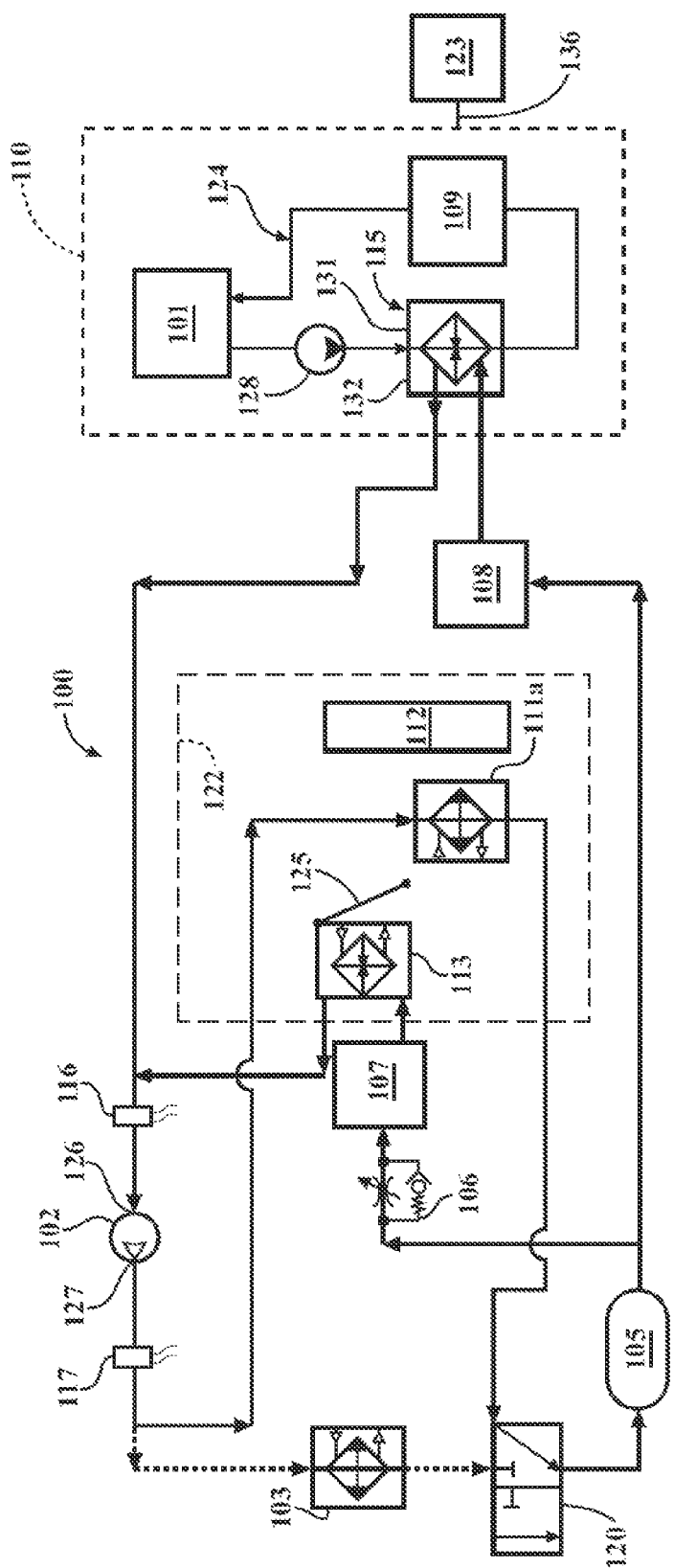
FIG. 3 is a schematic diagram of the first embodiment of the vapor compression system operating in a second mode.
Figure 4:
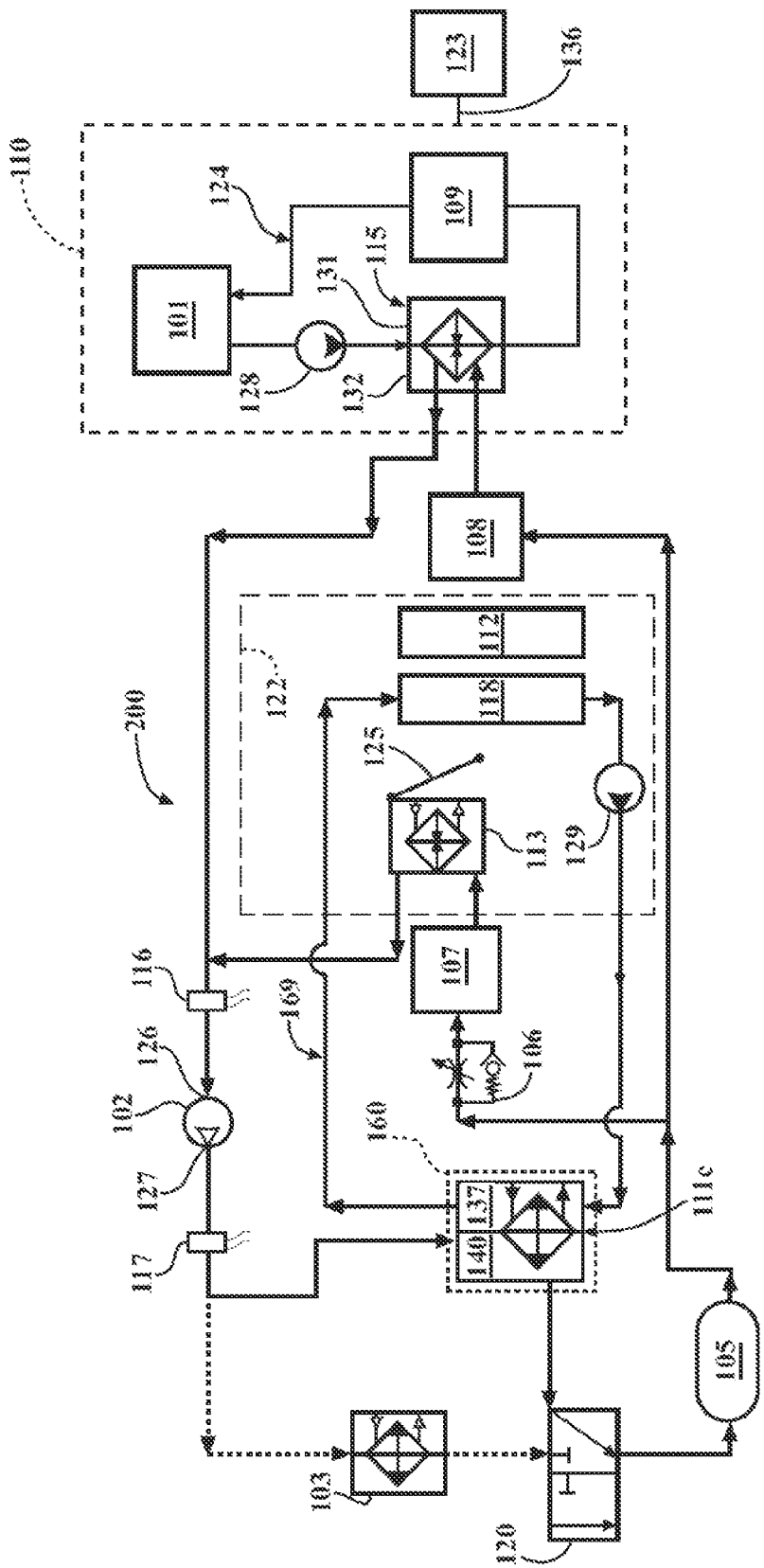
FIG. 4 is a schematic diagram of the second embodiment of the vapor compression system operating in the second mode.

If the controller 123 detects a second precondition 303 indicating that cabin heating and dehumidification are each required, the controller 123 will execute the second control action, shown at step 306, to allow the vapor compression system to operate in a second mode (shown in FIGS. 3 and 4).

Figure 5:
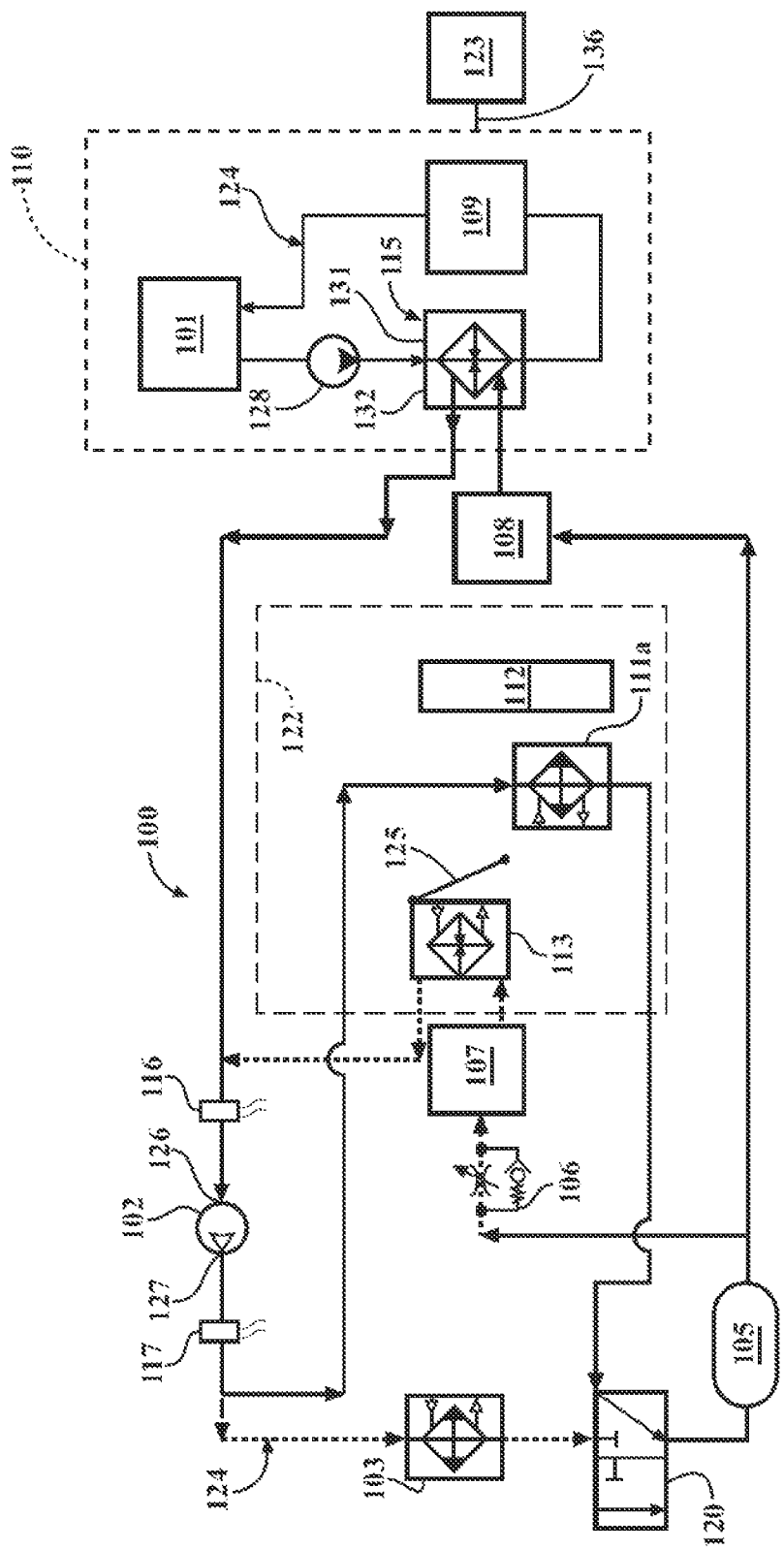
FIG. 5 is a schematic diagram of the first embodiment of the vapor compression system operating in a third mode.
Figure 6:
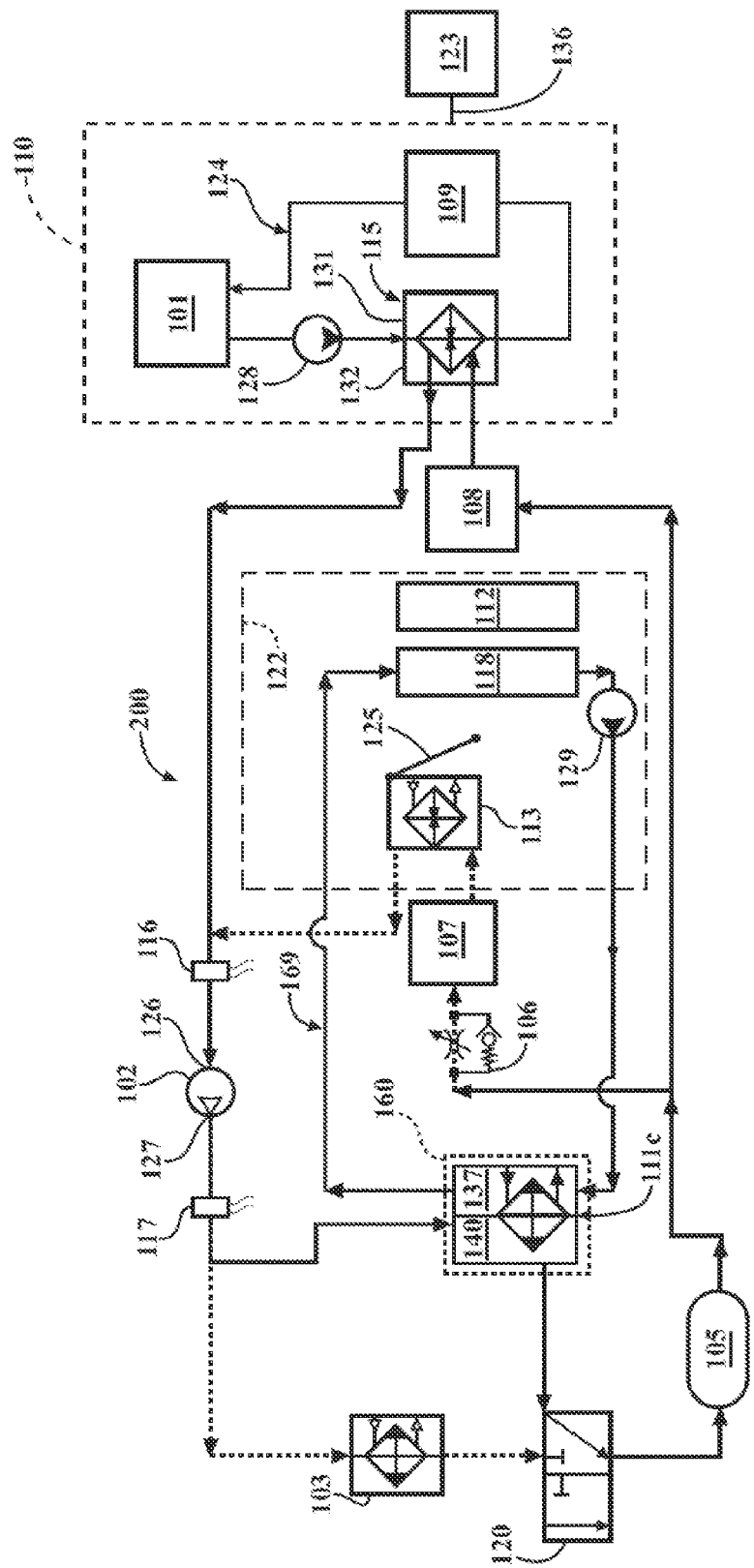
FIG. 6 is a schematic diagram of the second embodiment of the vapor compression system operating in the third mode.

If the controller detects a third precondition 304 indicating that only cabin heating is required, the controller 123 will execute the third control action, shown at step 307, to allow the vapor compression system to operate in a third mode (shown in FIGS. 5 and 6).

Referring to FIG. 10, the first control action 305 is detailed. Execution of the first control action 305 allows the system to operate in a first mode (shown in FIGS. 1 and 2) to effectuate cabin cooling.

At step 401, the controller 123 signals the first flow control valve 120 to occupy a first position to route the flow of all refrigerant in the vapor compression system 100, 200 through the first heat exchanger 103. Directing the flow of the refrigerant within the vapor compression system 100, 200 to the first heat exchanger 103 facilitates cabin cooling and cooling of the RESS chiller 115 by allowing the refrigerant to dissipate heat to the ambient environment as it passes through the first heat exchanger 103.

At step 402, the controller 123 signals the second flow control valve 106 to occupy an open position. Maintaining the second flow control valve 106 in the open position allows refrigerant to be selectively directed to each of the RESS chiller 115 via the first expansion device 108 and the cabin evaporator 113, via the second flow control valve 106 and the second expansion device 107 simultaneously in order to cool the cabin 122 and the RESS chiller 115.

At step 403, the controller 123 signals the operation of the compressor 102 at a predetermined speed to circulate refrigerant throughout the vapor compression system 100, 200.

Referring to FIG. 11, the second control action 306 is detailed. Execution of the second control action 306 allows the system to operate in a second mode (shown in FIGS. 3 and 4) to effectuate cabin heating and dehumidification.

At step 501, the controller 123 signals the first flow control valve 120 to occupy a second position (shown in FIGS. 3 and 4) to route the flow of all refrigerant in the vapor compression system 100, 200 through a second heat exchanger 111a, 111c and prohibit the refrigerant from flowing through the first heat exchanger 103 and dissipating heat to the ambient environment.

At step 502, the controller 123 signals the second flow control valve 106 to occupy the open position. Maintaining the second flow control valve 106 in the open position allows refrigerant to be selectively directed to each of the RESS chiller 115 via the first expansion device 108 and the cabin evaporator 113, via the second flow control valve 106 and second expansion device 107 simultaneously in order to cool and dehumidify the cabin 122 and cool the RESS chiller 115.

At step 503, the controller 123 signals the operation of the compressor 102 to circulate the refrigerant through the vapor compression system 100, 200. Step 503 is further detailed in steps 505-508, shown in FIG. 12. Operating the compressor 102 to circulate refrigerant through the vapor compression system 100, 200 further includes, at step 505, the controller 123 setting an initial predetermined operating speed for the compressor 102.

At step 506, the controller 123 determines a target evaporator air temperature of the cabin evaporator 113, by evaluating the humidity level and the temperature of the cabin 122 in order to facilitate cabin comfort, to avoid fogging of the cabin 122, and to prevent smells within the cabin 122. The goal of this step is to maximize the electric vehicle range while maintaining comfort within the vehicle cabin 122 by reducing the risk of high humidity within the vehicle cabin 122. The optimum evaporator air temperature is calculated for each of cabin comfort, anti-fogging, and prevention of smells. The controller 123 then selects, via an algorithm, the lowest evaporator air temperature produced by each of the outputs (cabin comfort, fogging, smell) as the target evaporator air temperature for operation.

To maintain cabin comfort it is desirable to maintain a humidity ratio of less than eleven (11) grams of moisture per kilogram of dry air. To prevent a smell issue within the cabin 122, it is desirable to maintain an evaporator air temperature less than about 10° C. If the system is operating to combat fogging, such as in a defrost mode, the evaporator air temperature should be set to a minimum, which may be from about 2° C. to about 4° C.

Once the target evaporator air temperature is calculated at step 506, the controller 123, at step 507 calculates a target compressor speed based on the target evaporator air temperature of the cabin evaporator 113.

At step 508, the controller 123 adjusts the compressor speed from the initial predetermined compressor speed to the target compressor speed, calculated based on the target evaporator air temperature.

The second control action 303 further includes, step 504. At step 504, the controller 123, evaluates the heat pump performance of the system 100, 200, when the compressor 102 is operating at a predetermined speed, namely the target compressor speed calculated in step 507, and dictated by the target evaporator air temperature calculated at step 506.

Figure 13:
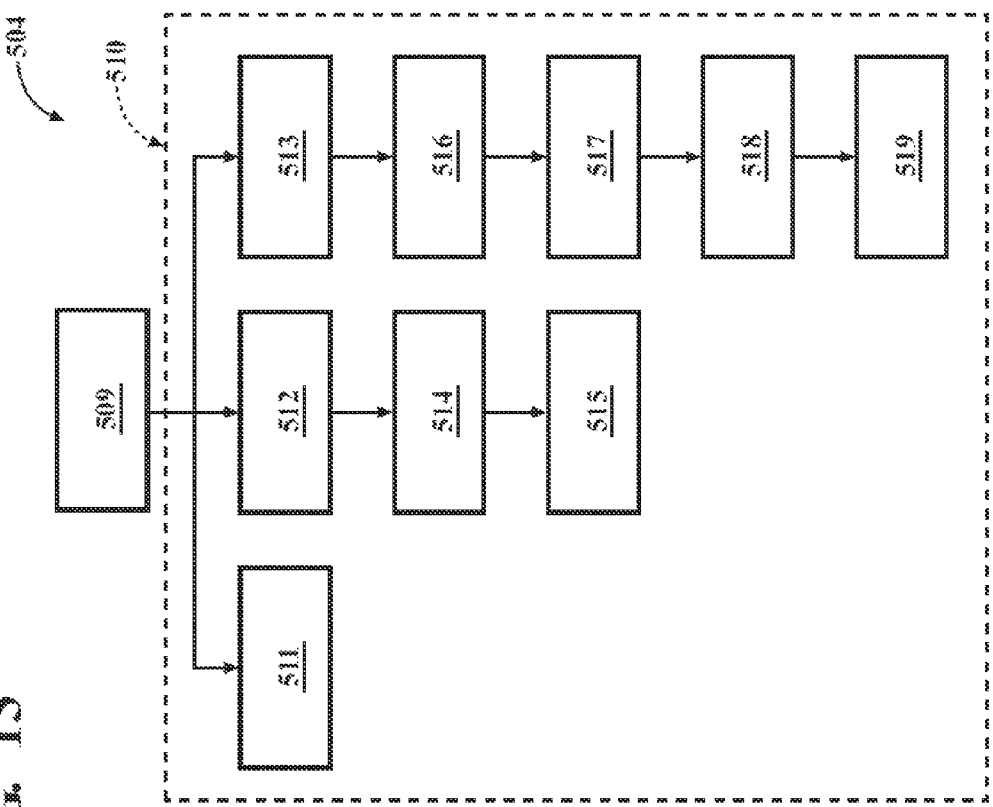
FIG. 13 is a flow diagram detailing the fourth step of the second control action, namely, evaluating the heat pump performance of the vapor compression system, when operating the compressor at a predetermined speed.

Step 504, is further detailed in steps 509-519, shown in FIG. 13. At step 509, the controller 123 returns a heat pump performance result, which indicates one of a first condition 511, a second condition 512, and a third condition 513. The first condition 511 is one in which the heat pump performance is adequate, meaning that the cabin 122 is receiving enough heat, but the vapor compression system 100, 200 is not performing unnecessary work. The second condition 512 is one of inadequate heat pump performance, wherein the vapor compression system 100, 200 is not producing enough heat for the vehicle cabin 122. The third condition 513 is one in which the heat pump performance is excessive, meaning the vapor compression system 100, 200 is providing heat to the cabin 122 in excess of the amount of heat needed, and is therefore performing unnecessary work.

Generally, during step 510, the controller 123, adjusts the flow of coolant through the RESS chiller 115 and the output of the electric heater 112 to obtain a heat pump performance result that indicates the first condition 511, wherein the heat pump performance is adequate. The flow through the RESS chiller 115 and the output of the electric heater 112 are adjusted based upon the heat pump performance result returned in step 509.

If the result returned at step 509 indicates a first condition 511 wherein the heat pump performance is adequate, the flow of coolant through the RESS chiller 115 and the output of the electric heater 112 may remain substantially unchanged.

If the result returned at step 509 indicates a second condition 512 wherein the heat pump performance is inadequate, at step 514, the controller 123 signals an increase in the flow of coolant through the RESS chiller 115 until the heat pump performance is adequate or the coolant flow through the RESS chiller 115 reaches a predetermined maximum.

At step 515, if the flow of coolant through the RESS chiller 115 reaches the predetermined maximum and the heat pump performance result remains one of inadequate performance 512, the controller 123, powers on and operates the electric heater 112 to provide additional heat to the air conditioned by the cabin evaporator 113 and transmitted to the cabin 122. If the electric heater 112 reaches a predetermined maximum and the heat pump performance result continues to indicate a second condition 512, in which the heat pump performance is inadequate, the controller 123, may power on and operate a battery heater 109.

If the result returned at step 509 indicates a third condition 513 wherein the heat pump performance is excessive, at step 516, the controller 123 reduces the output of the electric heater 112.

At step 517, if the heat pump performance result continues to indicate a third condition 513 wherein the heat pump performance is excessive, when the output of the electric heater 112 has been fully reduced to zero, the controller 123 reduces the flow of coolant through the RESS chiller 115.

At step 518, if the heat pump performance result remains one of excessive performance 513 when the output of the electric heater 112 has been fully reduced to zero and the flow of coolant through the RESS chiller 115 is reduced to a predetermined minimum, the controller 123 signals the first control valve 120 to occupy a third position (shown in FIGS. 7 and 8), wherein refrigerant is directed to each of the first heat exchanger 103 and the second heat exchanger 111a, 111c simultaneously, allowing the vapor compression system 100, 200 to operate in a fourth mode (shown in FIGS. 7 and 8), wherein the actual heating requirement of the cabin 122 is less than the required condenser heat rejection. Operation in the fourth mode allows the system 100, 200 to facilitate heating and cooling of the cabin 122 simultaneously. Operation in the fourth mode may be utilized when cooling and dehumidification as well as heating and reheating are both required simultaneously. Additionally, operation in the fourth mode provides additional condenser capacity via the first heat exchanger 103 and the second heat exchanger 111a, 111c in the event that the heating requirements of the cabin 122 are less than the combined loads of cooling requirements in the cabin 122, cooling requirements of the RESS 110, and requirements of the compressor 102. In such a case, the additional condensing capacity within the first heat exchanger 103 and the second heat exchanger 111a, 111c would be required to achieve a proper energy balance.

Figure 7:
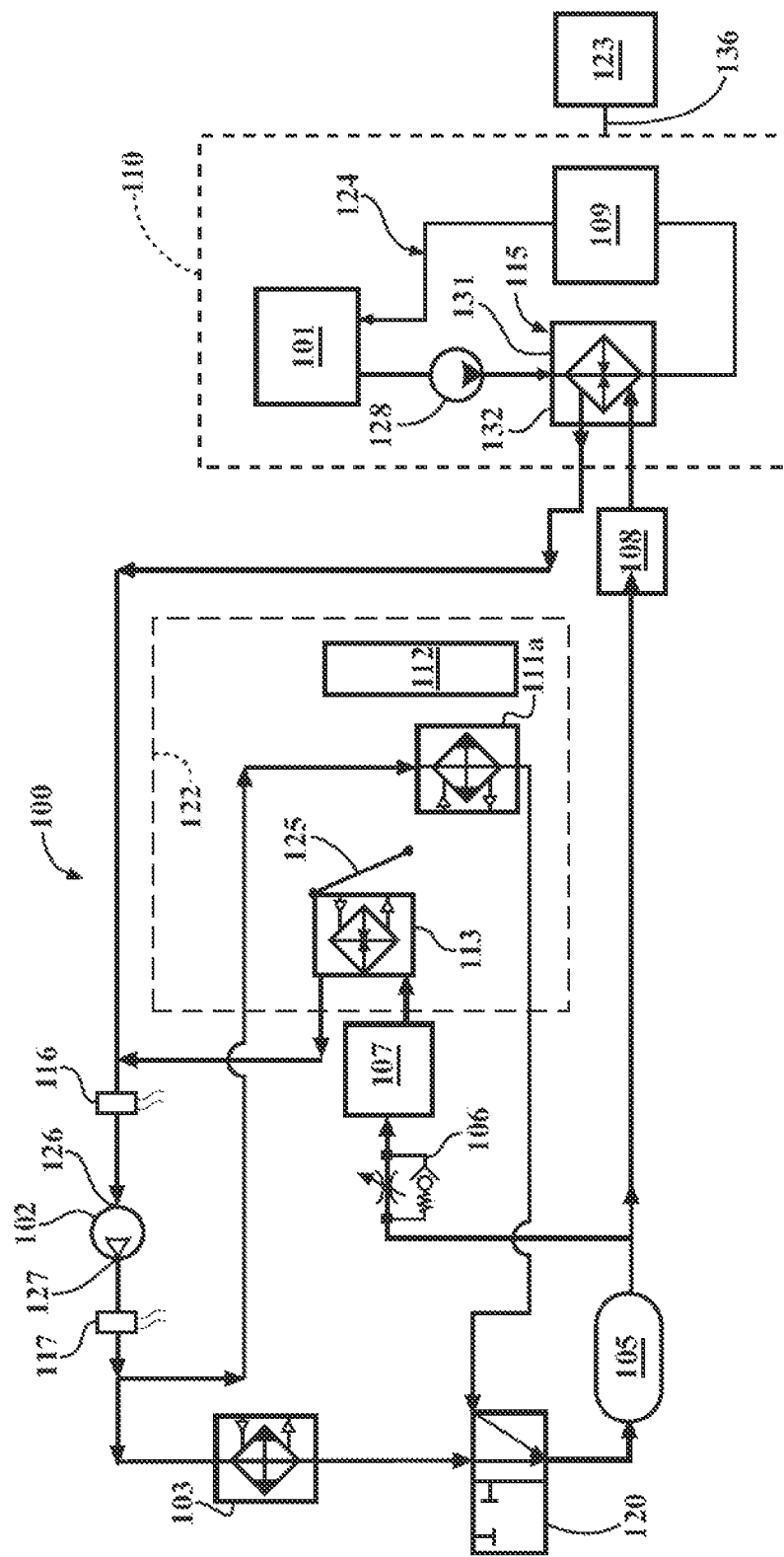
FIG. 7 is a schematic diagram of the first embodiment of the vapor compression system operating in a fourth mode.
Figure 8:
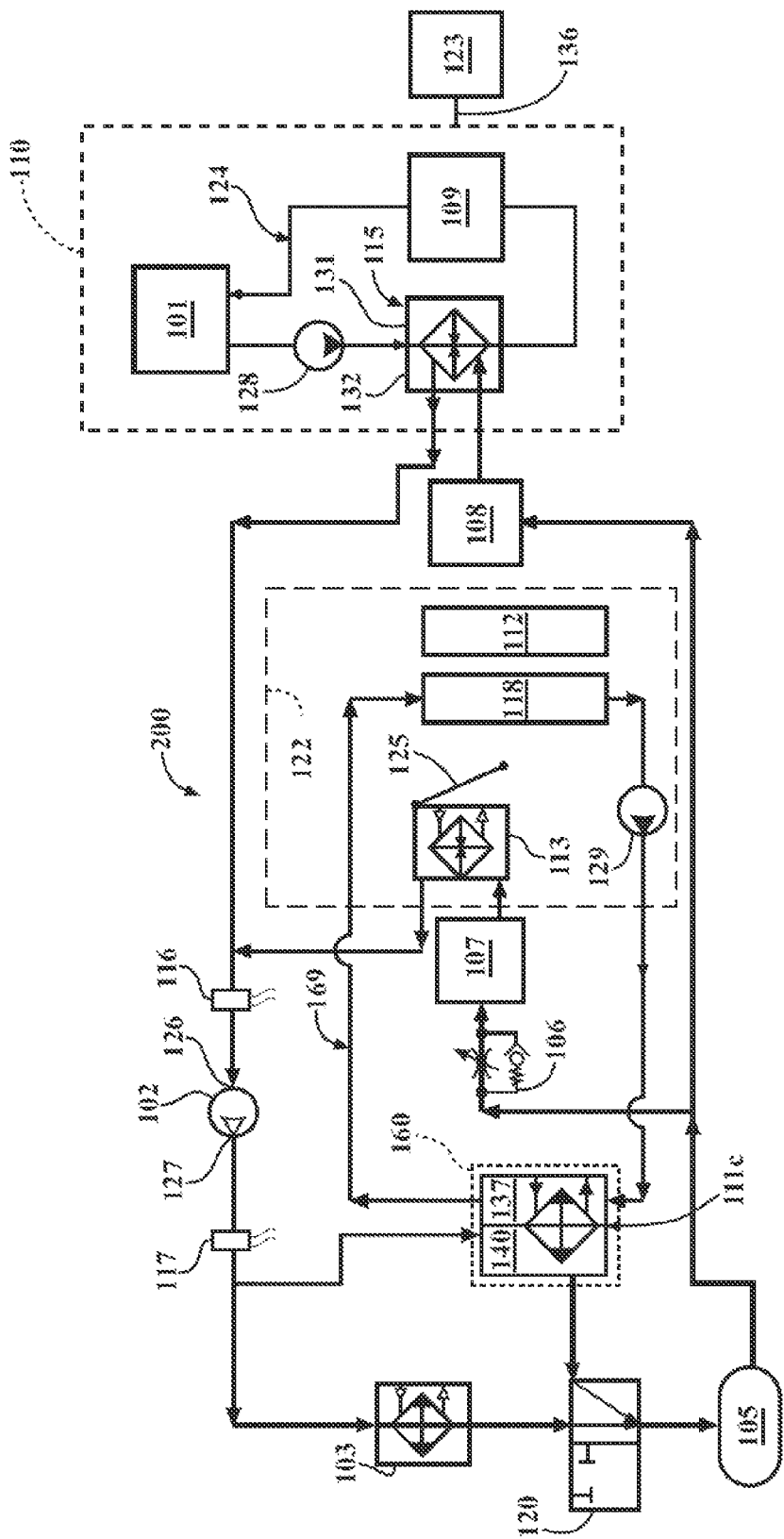
FIG. 8 is a schematic diagram of the second embodiment of the vapor compression system operating in the fourth mode.

At step 519, if the heat pump performance result continues to indicate a third condition 513 wherein the heat pump performance is excessive when the vapor compression system 100, 200 is operating in the fourth mode (as shown in FIGS. 7 and 8), the controller 123 adjusts an air mix door 125 to reduce the amount of air allowed to flow across each of the third heat exchanger 118 and the electric heater 112 and into the cabin 122.

Figure 14:
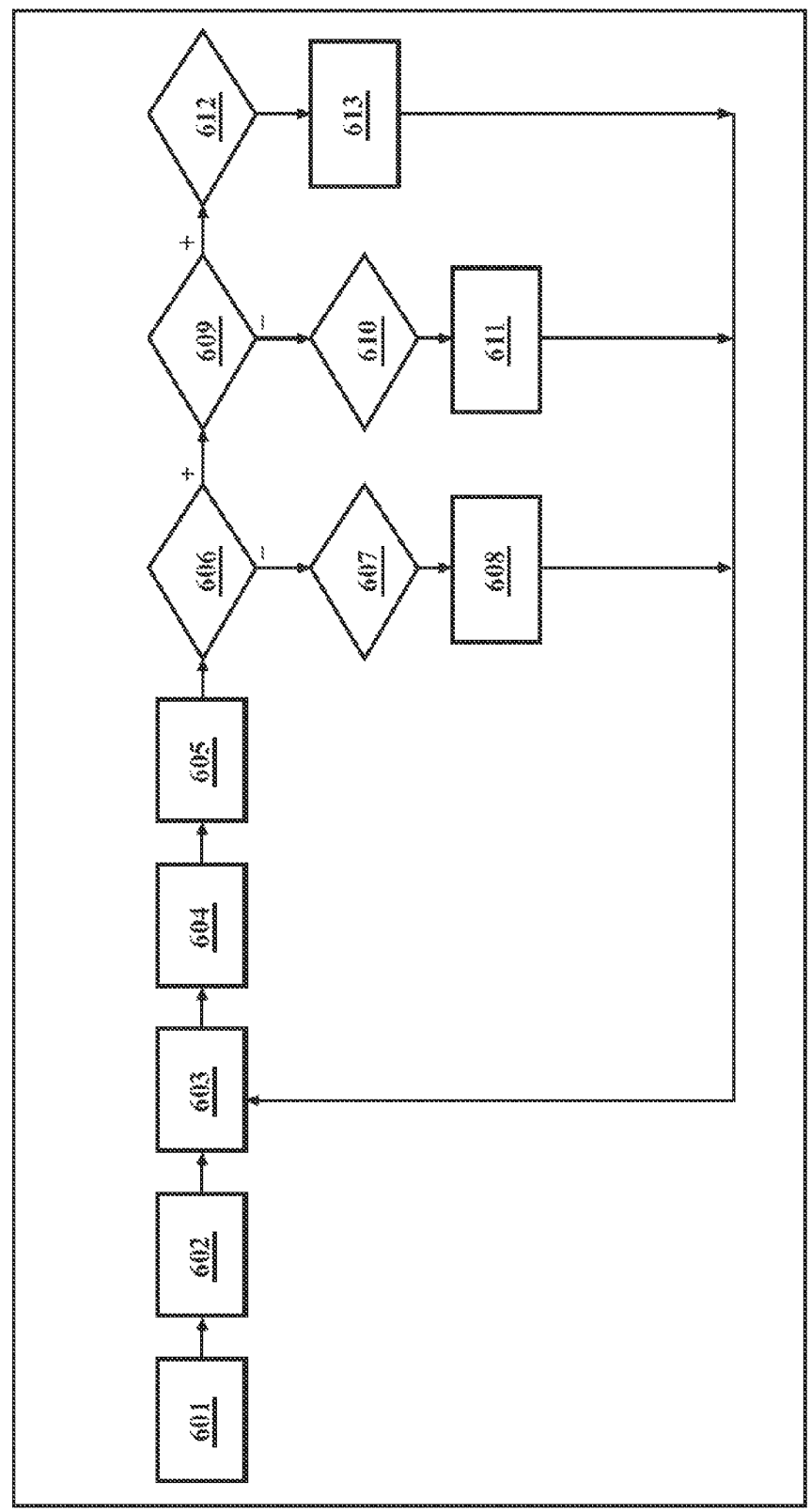
FIG. 14 is a flow diagram detailing the steps necessary to carry out the third control action.

Referring to FIG. 14, the third control action 307 is detailed. Execution of the third control action 307 allows the system to operate in the third mode (shown in FIGS. 5 and 6) to effectuate cabin heating without dehumidification and optimize system efficiency and heat pump performance.

At step 601, the controller 123 signals the first flow control valve 120 to occupy a second position (shown in FIGS. 5 and 6) to route the flow of all refrigerant in the vapor compression system 100, 200 through a second heat exchanger 111a, 111c and prohibiting the refrigerant from flowing through the first heat exchanger 103 and dissipating heat to the ambient environment.

At step 602, the controller 123 signals the second flow control valve 106 to occupy the closed position. Maintaining the second flow control valve 106 in the closed position forces all refrigerant flowing through the second heat exchanger 111a, 111c to be directed to the RESS chiller 115 via the first expansion device 108. Maintaining the second flow control valve 106 in the closed position prohibits flow of refrigerant to the cabin evaporator 113, via the second control valve 106 and second expansion device 107.

At step 603, the controller 123 signals the operation of the compressor 102 to circulate the refrigerant through the vapor compression system 100, 200, wherein the compressor operates at a predetermined speed balanced with the flow through the second heat exchanger 111a, 111c.

At step 604, the controller 123 evaluates the actual discharge pressure of the compressor 102 using readings from at least one high-side pressure sensor 117 placed downstream of the compressor outlet 127.

At step 605, the controller 123 determines a target discharge pressure to yield a desired predetermined refrigerant temperature.

At step 606, the controller 123 compares the actual discharge pressure evaluated in step 604, and the target discharge pressure, calculated at step 605.

If the actual discharge pressure is greater than the target discharge pressure the controller 123 will execute steps 607 and 608. If the actual discharge pressure is less than the target discharge pressure, the controller 123, will execute steps 609-613.

When the actual discharge pressure is greater than the target discharge pressure the controller will execute step 607. At step 607, the controller 123, as shown in the system shown in FIG. 5, increases the airflow rate through the second heat exchanger 111a until the airflow rate through the second heat exchanger 111a reaches a predetermined maximum. At step 607, the controller 123, in the system shown in FIG. 6, increases the flow of coolant through the second heat exchanger 111c until the flow rate throughout the second heat exchanger 111c reaches a predetermined maximum or the target discharge pressure is reached.

If the actual discharge pressure remains greater than the target discharge pressure after the flow of, airflow or coolant respectively, through the second heat exchanger 111a, 111c has reached the predetermined maximum, the controller 123 will execute step 608. At step 608, the controller 123 reduces the operating speed of the compressor 102 until the target discharge pressure is reached.

When the actual discharge pressure is less than the target discharge pressure the controller 123 will execute step 609. At step 609, the controller 123 determines whether the suction pressure at the compressor inlet 126 is greater than or less than a predetermined durability limit endurable by the compressor 102. The predetermined durability limit for suction pressure at the compressor inlet 126 may range from about 0.05 MPaA to about 0.20 MPaA.

If the suction pressure at the compressor inlet 126 is less than the predetermined durability limit of the compressor 102, the controller 123, will execute steps 610-611. If the suction pressure is greater than the determined durability limit of the compressor 102, the controller 123 will execute steps 612-613.

When the suction pressure is less than the predetermined durability limit of the compressor 102, the controller 123 will execute step 610. At step 610, the controller 123 reduces the speed of the compressor 102 until the compressor speed reaches a predetermined minimum.

If the suction pressure remains less than the predetermined durability limit of the compressor 102 after the speed of the compressor 102 is reduced to the predetermined minimum value, the controller will execute step 611. At step 611, the controller 123 increases the flow of coolant through the RESS chiller 115, while maintaining the target discharge pressure calculated at step 605.

When the suction pressure is greater than the predetermined durability limit of the compressor 102, the controller 123 will execute step 612. At step 612, the controller 123, increases the speed of the compressor 102, to increase the actual discharge pressure to the target discharge pressure calculated at step 605, until the speed of the compressor 102 reaches a predetermined maximum speed.

If the suction pressure remains greater than the predetermined durability limit of the compressor 102 after the speed of the compressor 102 is increased to the predetermined maximum value, the controller 123 will execute step 613. At step 613, the controller 123 decreases the flow of refrigerant through the second heat exchanger 111a, 111c, while maintaining the target discharge pressure calculated at step 605. If the flow of coolant reaches a predetermined maximum value and each of the actual discharge pressure and the compressor suction pressure remain greater than the predetermined target discharge pressure and predetermined compressor durability limit respectively, the controller 123, may power on and operate a battery heater 109 to increase the system evaporator load and thereby increase the actual discharge pressure to achieve the target discharge pressure.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method for controlling a combined heating and cooling vapor compression system for use in a vehicle, the method comprising the steps of:
    detecting one of a first precondition, a second precondition, and a third precondition, with at least one controller, wherein the first precondition is a demand for cooling in a vehicle cabin, the second precondition is a demand for heating and dehumidification in the vehicle cabin, and the third precondition is a demand for heating only in the vehicle cabin;
    executing a first control action, with the at least one controller, when the first precondition is detected, to allow the vapor compression system to operate in a first mode wherein cooling of the cabin is demanded;
    executing a second control action, with the at least one controller, when the second precondition is detected, to allow the vapor compression system to operate in a second mode, wherein each of heating of the cabin and dehumidification of the cabin are demanded, wherein the second control action includes the steps of:
        signaling a first flow control valve to occupy a second position to route a refrigerant in the vapor compression system through a second heat exchanger;
        signaling a second flow control valve to occupy an open position, such that the refrigerant flows through each of a cabin evaporator and an RESS chiller simultaneously, to cool the RESS chiller and to cool and dehumidify the cabin;
        operating a compressor to circulate the refrigerant through the vapor compression system; and
        evaluating a heat pump performance of the vapor compression system, when the compressor is operating at a predetermined operating speed, such that evaluating the heat pump performance of the vapor compression system further includes returning a heat pump performance result, wherein the heat pump performance result indicates a heat pump performance resulting in one of a first condition, a second condition, and a third condition; and
        adjusting the flow of a coolant through an RESS chiller and adjusting an output of an electric heater to obtain a heat pump performance result which indicates the first condition, such that adjusting the flow of the coolant through an RESS chiller and adjusting the output of an electric heater to obtain a heat pump performance result which indicates the first condition further includes:
            reducing the output of the electric heater;
            reducing coolant flow through the RESS chiller;
            signaling the first control valve to occupy a third position, wherein the refrigerant is directed to each of the first heat exchanger and the second heat exchanger simultaneously, such that the vapor compression system operates in a fourth mode; and
            adjusting an air mix door to reduce the amount of air allowed to flow across the heater and into the cabin; and
    executing a third control action, with the at least one controller, when the third precondition is detected, to allow the vapor compression system to operate in a third mode, wherein only heating of the cabin is demanded.

2. The method of claim 1 wherein the first control action comprises the steps of:
    signaling the first flow control valve to occupy a first position to route the refrigerant in the vapor compression system through the first heat exchanger, such that the refrigerant dissipates heat to an ambient environment;
    signaling the second flow control valve to occupy the open position, such that the refrigerant flows through each of the cabin evaporator and the RESS chiller simultaneously, to cool the cabin and to cool the RESS chiller; and
    operating the compressor at a predetermined speed to circulate the refrigerant throughout the vapor compression system.

3. The method of claim 2 wherein operating the compressor to circulate the refrigerant through the vapor compression system further comprises the steps of:
    setting the predetermined operating speed for the compressor;
    determining a target evaporator air temperature of the cabin evaporator by evaluating a humidity level of the cabin and a temperature of the cabin;
    calculating a target compressor speed based on the target evaporator air temperature; and
    adjusting the compressor speed to the target compressor speed.

4. The method of claim 3 wherein the target evaporator air temperature ranges from about 2° C. to about 10° C.

5. The method of claim 1 wherein the flow rate of the coolant through the RESS chiller is increased in order to scavenge heat from the RESS chiller until the flow rate of coolant through the RESS chiller reaches a predetermined maximum; and wherein the electric heater is powered on when the flow rate of the coolant through the RESS chiller reaches the predetermined maximum, such that the heat pump performance result is adjusted from a result indicating the second condition to a result indicating the first condition.

6. The method of claim 1 wherein reducing the output of the electric heater, reducing flow of the refrigerant through the RESS chiller, signaling the first control valve to occupy a third position, and adjusting an air mix door alter the heat pump performance from a result indicating the third condition to a result indicating the first condition.

7. The method of claim 1 wherein the third control action further comprises:
    signaling the first flow control valve to occupy the second position to route the refrigerant in the vapor compression system through the second heat exchanger;
    signaling the second flow control valve to occupy a closed position, such that the refrigerant flows through the RESS chiller and the refrigerant is blocked from flowing through the cabin evaporator;

operating the compressor to circulate the refrigerant through the vapor compression system;

evaluating an actual discharge pressure of the refrigerant expelled from the compressor using a high-side pressure sensor;

determining a target discharge pressure to yield a predetermined refrigerant temperature; and comparing the actual discharge pressure and the target discharge pressure.

8. The method of claim 7 wherein the actual discharge pressure is greater than the target discharge pressure, the method further comprising the steps of:

increasing flow of the coolant through the second heat exchanger until one of a flow rate of the coolant through the second heat exchanger reaches a predetermined maximum flow rate and the target discharge pressure is reached; and reducing the compressor speed, when the flow rate of the coolant through the second heat exchanger reaches the predetermined maximum flow rate until the target discharge pressure is reached.

9. The method of claim 7 wherein the actual discharge pressure is less than the target discharge pressure, the method further comprising the step of:

determining whether a compressor suction pressure is one of greater than a predetermined suction durability limit of the compressor and less than the predetermined suction durability limit of the compressor.

10. The method of claim 9 wherein the compressor suction pressure is less than the predetermined suction durability limit of the compressor, the method further comprising the steps of:

reducing the compressor speed until the compressor speed reaches a predetermined minimum value; and increasing the flow rate of the coolant through the RESS chiller, while maintaining the target discharge pressure, when the compressor speed is at the predetermined minimum value.

11. The method of claim 9 wherein the compressor suction pressure is greater than the predetermined suction durability limit of the compressor, the method further comprising the steps of:

increasing the compressor speed, to increase the actual discharge pressure to the target discharge pressure, until the compressor reaches a predetermined maximum speed; and increasing the flow rate of the coolant through the RESS chiller, when the compressor is at the predetermined maximum speed, to increase the actual discharge pressure to the target discharge pressure.

12. The method of claim 9 wherein the predetermined suction durability limit of the compressor is from about 0.05 MPa to about 0.20 MPa.

* * * * *